United States Patent [19]

Haentjens

[11] 4,171,852

[45] Oct. 23, 1979

[54] PROPULSION OF SLURRY ALONG A PIPELINE BY ULTRASONIC SOUND WAVES

[76] Inventor: Walter D. Haentjens, R.D. #1 Box 121, Sugarloaf, Pa. 18249

[21] Appl. No.: 810,503

[22] Filed: Jun. 27, 1977

[51] Int. Cl.$^2$ .............. B65G 53/30; F04B 15/02; F04F 7/00
[52] U.S. Cl. .................. 406/85; 417/240; 417/322; 417/900; 406/86
[58] Field of Search .............. 417/53, 240, 241, 900; 417/322; 302/14, 66

[56] References Cited

U.S. PATENT DOCUMENTS

| | | | |
|---|---|---|---|
| 1,466,413 | 8/1923 | Schaanning | 302/14 |
| 3,165,061 | 1/1965 | Smith et al. | 417/240 X |
| 3,325,222 | 6/1967 | Round et al. | 302/14 |
| 3,633,976 | 1/1972 | Kruyer | 302/14 |
| 3,682,511 | 10/1970 | Bodine | 302/14 |
| 3,973,760 | 8/1976 | Browning et al. | 302/14 |
| 3,985,344 | 10/1976 | McCord | 302/14 |
| 4,004,736 | 1/1977 | George | 302/14 |

FOREIGN PATENT DOCUMENTS 1175356 12/1964 United Kingdom .

OTHER PUBLICATIONS

Acoustical Engineering, pp. 682-686, 692-696.

*Primary Examiner*—Carlton R. Croyle
*Assistant Examiner*—Richard E. Gluck
*Attorney, Agent, or Firm*—Hill, Van Santen, Steadman, Chiara & Simpson

[57] ABSTRACT

Transmission of a slurry along a pipeline by ultrasonic sound waves introduced at an angle to the direction of flow of the slurry particles to intersect the moving particles with a forward and lifting component. Ultrasonic generators or transducers are placed along the bottom of a pipeline at preselected angles relative to the pipeline and flow of material therealong. The ultrasonic waves are in the nature of mechanical waves and may be of a given frequency for specific types of solids. The slurry for which this apparatus is particularly adapted is a slurry of coal particles in the range of approximately 30 to 70% solids by weight with a general spatial concentration of approximately 50%. The mechanical ultrasonic waves propagating in the slurry, which is an elastic body, lift the particles by the angular components of the waves and propel the particles along the pipeline by the horizontal components of the ultrasonic waves. The ultrasonic transducers are of known forms and are mounted along the pipeline in predetermined spaced relation with respect to each other and open to the pipeline to propel the particles at an average optimum velocity and elevate the particles above the bottom of the pipeline to prevent settling of the particles in the bottom of the pipeline.

6 Claims, 3 Drawing Figures

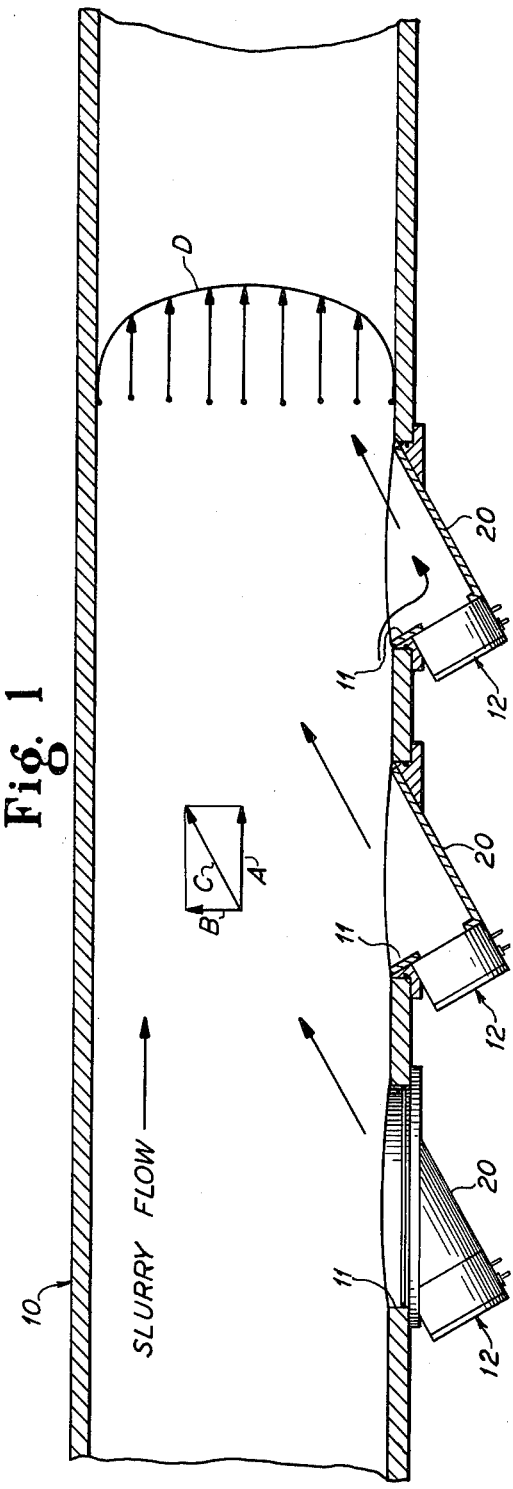
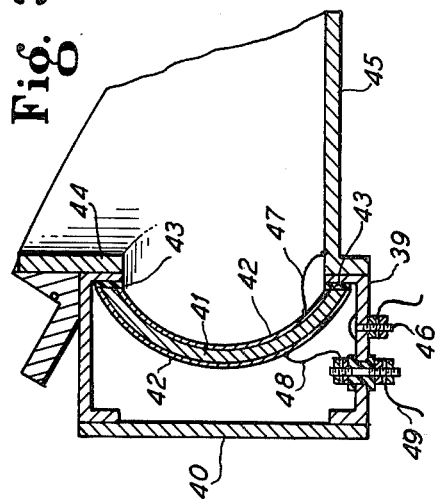
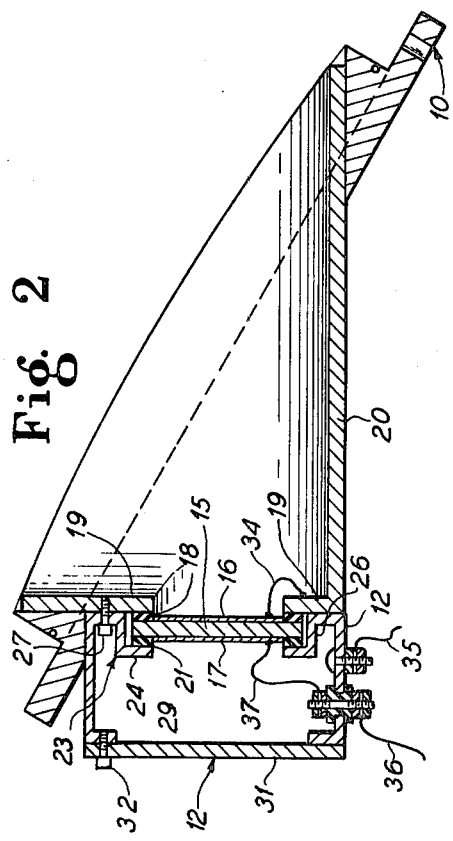

PROPULSION OF SLURRY ALONG A PIPELINE BY ULTRASONIC SOUND WAVES

PRIOR ART

Sonic waves have heretofore been used to facilitate the gravity flow of granular material as in British Patent No. 1,175,356, while ultrasonic waves have been used for cleaning various articles and producing jets of water or other liquid as disclosed in the respective U.S. Pat. Nos. 3,973,760; 3,985,344 and 4,004,736. Copies of all of these patents accompany this application and are incorporated herein as a part thereof.

Ultrasonic waves, however, have never been used to induce a flow of slurry along a pipeline, and maintain the flow and keep the particles from settling on the bottom of the pipeline insofar as applicant is aware.

SUMMARY AND ADVANTAGES OF INVENTION

A series of ultrasonic transducers is placed along the bottom of a slurry pipeline for the length of the pipeline at an angle with respect to the direction of flow of the slurry along the pipeline. The transducers open to the interior of the pipeline. The sound waves emitted are in the nature of high-frequency mechanical waves and not only prevent settling of the slurry particles along the bottom of the pipeline, but also induce a flow of slurry along the pipeline. The frequency of the sound waves may be at an optimum based on particle size, density and average velocity of flow of slurry along the pipeline.

In the present invention, the slurry is a coal slurry having particles in a range which may be of approximately 30 to 70% solids by weight, with a maximum spatial concentration of approximately 50%. The ultrasonic waves are mechanical waves and enter the pipeline at an angle of approximately 30° to the direction of the flow of slurry along the pipeline and effect propulsion of the slurry along the pipeline by the horizontal components of the waves.

The ultrasonic waves are transmitted through a diaphragm and if focusing should be of advantage to enhance the flow, a focusing ultrasonic generator, which may be a barium titanate ceramic generator, may be used. Such a generator is shown in FIG. 16.5, page 696 of Olson "Acoustical Engineering." The slurry itself, which is a cold water slurry, is intended to carry away any heat generated by the transducers and maintain the transducers at a normal temperature.

The transducers are preferably energized simultaneously, although there may be cases where it may be desirable to energize the transducers in a selected sequence to provide an increased force to lift and propel the slurry as it passes each transducer and to thereby effect a continuous flow of slurry and avoid precipitation thereof on the bottom of the pipeline.

An advantage of the invention is that a slurry may be propelled along a pipeline without the use of conventional pumps by transducers which add energy to the slurry particles as they pass along the pipeline and further lift the particles above the bottom of the pipeline.

A further advantage of the invention is the fact that no dilution occurs as would happen if flushed reciprocating or conventional centrifugal pumps were used.

A further advantage of the invention is that the mechanical force generated by high-frequency sound in the ultrasonic range may be used to transport and prevent the settling of slurries along a pipeline by spacing ultrasonic transducers along the pipeline at an angle to the path of the slurry flow to effect propulsion of the slurry along the pipeline and prevent the settling of the heavier solids in the pipeline.

A further advantage of the invention is the addition of supersonic energy to slurry particles by the use of a series of ultrasonic transducers, in which the transducers add energy to the particles as they pass from one transducer to the next and in which the energy added by the ultrasonic transducers propels the slurry along a pipeline.

A still further advantage of the invention is the inducing of a flow of slurry along a pipeline and at the same time, elevating slurry particles above the bottom of the pipeline, by the use of the mechanical force generated by ultrasonic waves entering the pipeline at a forward and upwardly inclined angle relative to the axis of the pipeline.

Other objects, features and advantages of the invention will be readily apparent from the following description of several preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 1 is a diagrammatic view of a portion of a slurry pipeline showing a series of ultrasonic transducers placed along the bottom of the pipeline at a forward and upwardly inclined angle relative to the flow of slurry along the pipeline, and diagrammatically illustrating the average velocity of the slurry along the pipeline;

FIG. 2 is a view illustrating one form of transducer that may be used; and

FIG. 3 is a diagrammatic view illustrating a focusing transducer which may be placed along the pipeline.

DESCRIPTION OF PREFERRED EMBODIMENTS

In the embodiment of the invention illustrated in FIGS. 1 and 2 of the drawings, I have diagrammatically shown a portion of a slurry pipeline 10 (in longitudinal section) having a series of windows or openings 11 spaced along the pipeline at equal intervals and having a series of ultrasonic transducers 12 sending ultrasonic sound waves through the windows 11 in the pipeline at angles in the order of 30° relative to the flow of slurry along the pipeline. The angles may vary as conditions require. The horizontal components of the mechanical force exerted by the ultrasonic waves are indicated by A extending along the center of the pipeline. The vertical components are indicated by B extending vertically of the center of the pipeline and the angular components are indicated by C extending at an angle of substantially 30° relative to the horizontal components.

It should be understood that ultrasonic waves are mechanical waves and propagate in any elastic material which may be a slurry and that the relation of velocity to frequency and wavelength is determined by the formula $V = F\nu$, where V equals velocity in meters per second, F is the frequency in hertz (cycles per second) and $\nu$ is the wavelength in meters per cycle. As for example, the velocity of longitudinal ultrasonic waves in water may be in the order of 1500 meters per second.

The velocity of the slurry through the pipeline may be in the neighborhood of approximately five feet or one and one-half meters per second. The actual flow regime may be either turbulent or laminar, depending on the nature of the slurry. Because of the upward component of the ultrasonic waves, the optimum velocity may be lower than required with conventional pump stations.

The slurry may be supplied from a sump which may be similar to that shown in my U.S. Pat. No. 3,966,262, dated June 29, 1976. As previously mentioned, the consistency of the slurry may be in the range of approximately 30 to 70% solids by weight with a general maximum spatial concentration of approximately 50%.

While I have herein set forth a desirable rate of flow of slurry along the pipeline, the velocity in the pipe may vary as long as it is equal to or above a critical velocity which will prevent settling in the pipeline. In my process, this velocity may be lower as the mechanical energy of the sound waves is relied upon to lift the particles by the vertical components of the ultrasonic waves and the mounting of the transducers along the bottom of the pipeline at an angle shown as being in the order of 30°, but which may be as high as 45° for certain types of slurries and conditions.

In FIG. 2, a form of ultrasonic transducer which may be used to advantage is shown. This is the type of transducer that has been used an an underwater projector of the piezoelectric type. Such a transducer is shown in FIG. 16.3 of Olson's "Acoustical Engineering," page 695, Chapter 16, and described in the last paragraph of page 694. Such transducers are also outlined in Sections 15.9; 15.11 and 15.12 of Chapter 15 of "Acoustical Engineering." Xerox copies of these sections and pages accompany this application and are made a part therof.

The present transducer projects its sound waves through liquid and solid particles. The liquid may take the place of a cooling means. A cooling means, however, may be used where it will enhance the operation of the transducer.

Each transducer 12 may include an X-cut-quartz crystal 15 (FIG. 2) plated on opposite sides to form electrodes 16 and 17. The electrode 16 is sealed to a flanged portion 19 of a duct 20 shown as entering the pipeline at an angle in the order of 30° relative to the longitudinal axis of the pipeline. The end of said duct conforms generally to the window 11 and where the pipeline is cylindrical, the end of the duct will be generally oval. An insulator and seal 18 abuts the outside of the flanged portion 19 and is clamped or otherwise secured thereto by the crystal 15. The insulator 18 is shown as abutting the electrode 16 and insulating said electrode from the flange 19. An insulator 21 abuts the opposite side of the crystal from the insulator 18 and the outer peripheral portion of the electrode 17 and is clamped thereto by a clamping and housing member 23. The clamping and housing member 23 has an annular flanged portion 24 spaced outwardly of a base portion of said insulator parallel to the flange 19 by a cylindrical leg 26 and is secured to the flange 19 by machine screws 27. The clamping and housing member 23 may have a generally cylindrical exterior and has an outer flanged portion 29 to which a cover 31 is detachably secured as by machine screws 32.

The electrode 16 is shown as grounded by the duct 20 by a ground wire 34. A terminal 35 connects said duct and the ground wire 34 to ground. The electrode 17 is connected to a terminal 36 by a wire 37. The connections are conventional connections and need not herein be shown or described further.

Where focusing may be beneficial, a focusing transducer 40, like that shown in FIG. 3, may be used. Such a transducer is based on principles similar to those shown in FIG. 16.5 of "Acoustical Engineering" incorporated herein as a part of this application and may include a barium titanate crystal 41 made from an electrostrictive material pre-polarized to assume properties similar to piezoelectric materials. The crystal 41 is covered on each side by silver electrodes 42. The inner of said electrodes may be sealed to the bottom of the pipeline by a seal 43 abutting a flanged portion 44 of a duct or spout 45 similar to the spout 20. One terminal 46 connects the inner electrode 42 to ground by a ground wire 47. The seal 43 as shown in FIG. 3 abuts the ends of said electrodes and the crystal 41. An opposite electrode 42 is connected to a terminal 49 by a wire 48. The terminals 46 and 49 may be connected to a conventional piezoelectric circuit commonly used for such transducers.

While the transducer 40 shown in FIG. 16.5 of "Acoustical Engineering" is cooled by a water cooling coil, such a cooling coil need not necessarily be used for the present disclosure since the transducer has direct contact with the flowing slurry.

It should be understood that the ultrasonic generators shown in the drawings and utilizing the principles of FIGS. 16.2 and 16.5 of "Acoustical Engineering" are illustrative only and that other well-known forms of ultrasonic wave generators may be used in place thereof.

It should further be understood that where desired the phase relationship between one transducer and the next may be varied to add energy to the particles of slurry as they pass from one transducer to the next and that the sonic waves being inclined relative to the direction of flow of slurry along the pipeline lift the particles by the vertical components of the ultrasonic waves and also effect the propulsion of particles along the pipeline at an average velocity illustrated by curve D in FIG. 1, to effect a velocity profile in the pipeline as illustrated by this curve, and add energy to the slurry particles as passing from one transducer to the next, which will be a function of line velocity.

It should further be evident that all of the slurry particles will not travel in a turbulent flow, the velocity profile is quite flat and the slurry particles are propelled by the mechanical force of the sound waves in a predetermined phase relationship of the transducers placed along the pipeline.

It should further be understood that the optimum frequency of the sound waves is based on particle size, density and required average velocity in the pipeline. As previously mentioned, the waves must create at least a critical velocity lifting the particles above the pipeline and preventing settling thereof in the pipeline, as well as propelling the slurry through the pipeline.

It should further be understood that the pipeline diagrammatically shown in FIG. 1 is only a short section of the pipeline and the pipeline may be of any required length.

I claim as my invention:

1. For use in the propulsion of a slurry supplied from a source of slurry,
   a slurry pipeline leading from the source,
   a plurality of ultrasonic transducers sealed to the bottom of the pipeline at angular relation with respect to the flow of slurry along the pipeline and closed except through openings to the pipeline in the direction of the sound waves induced therein and positioned to induce mechanical sound waves into the slurry in the pipeline at such an angle as to produce mechanical forces to effect travel of the slurry along the pipeline at an average velocity by the horizontal mechanical forces of the sound waves and to prevent settling of the particles in the pipeline by the vertical and angular mechanical forces of the sound waves.

2. The apparatus of claim 1, wherein the transducers are disposed at equal angles relative to each other and are positioned to have a vertical component preventing the settling of slurry particles along the bottom of the pipeline and angular and horizontal components producing an average velocity of the slurry along the pipeline.

3. The apparatus of claim 2, wherein the angles of transducers relative to the center of the pipeline are in the order of 30°.

4. The apparatus of claim 3 wherein the transducers are magnetostriction ultrasonic generators capable of producing large acoustical outputs and mechanical elevating and propulsion forces and closed except to the direction of the elevating and propulsion forces produced.

5. In a slurry flow pipeline for coal slurries and the like,
a plurality of cylindrical pipes connected together in end-to-end relation with respect to each other,
a plurality of windows equally spaced along the bottom of said pipeline for substantially the length thereof,
ducts opening to the pipeline through said windows and closed to prevent the entrance of fluid thereto except through said windows, and angularly positioned relative to the pipeline in the direction of flow of slurry along the pipeline,
a transducer sealed to the open portion of each duct at the same angular relation relative to the center of the pipeline as each duct and opening only to the pipeline to induce mechanical sound waves into the pipeline and add energy to the slurry in the pipeline, and thereby effect propulsion of the slurry along the pipeline without dilution of the slurry traveling along the pipeline and at a minimum pratical velocity which will effect the flow of slurry along the pipeline and avoid friction losses and high enough to prevent settling of slurry particles in the pipeline.

6. The slurry flow pipeline of claim 5, wherein the slurry particles consist of approximately 30 to 70% solids by weight with a general maximum spatial concentration relative to the cross section of the pipeline of approximately 50% and the transducers are ultrasonic transducers in the form of quartz crystals inducing ultrasonic sound waves into the pipeline at such angles and frequencies as to add energy to the slurry particles and the sound waves are induced into the pipeline at angles of between 30° and 45° relative to the axis of the pipeline in the direction of the flow of slurry through the pipeline giving the sound waves vertical components lifting the slurry particles and horizontal components effecting the flow of slurry along the pipeline.

* * * * *